(12) United States Patent
Bernon-Enjalbert et al.

(10) Patent No.: US 10,800,449 B2
(45) Date of Patent: Oct. 13, 2020

(54) COMPUTER ARCHITECTURE AND FUNCTIONAL ARCHITECTURE FOR INCREASING THE FAIL-SAFETY OF AUXILIARY POWER STEERING

(71) Applicant: HELLA GMBH & CO. KGAA, Lippstadt (DE)

(72) Inventors: Valerie Bernon-Enjalbert, Tournefeuille (FR); Jerome Dietsch, Lavernose-Lacasse (FR); Frank Galtie, Plaisance du Touch (FR)

(73) Assignee: Hella GmbH & Co. KGaA, Lippstadt (DE)

( * ) Notice: Subject to any disclaimer, the term of this patent is extended or adjusted under 35 U.S.C. 154(b) by 193 days.

(21) Appl. No.: 16/100,859

(22) Filed: Aug. 10, 2018

(65) Prior Publication Data

US 2019/0039644 A1 Feb. 7, 2019

Related U.S. Application Data

(63) Continuation of application No. PCT/EP2017/050969, filed on Jan. 18, 2017.

(30) Foreign Application Priority Data

Feb. 10, 2016 (DE) .................. 10 2016 102 259

(51) Int. Cl.
*B62D 5/30* (2006.01)
*B62D 5/00* (2006.01)
(Continued)

(52) U.S. Cl.
CPC ......... *B62D 5/0484* (2013.01); *B62D 5/0493* (2013.01)

(58) Field of Classification Search
None
See application file for complete search history.

(56) References Cited

U.S. PATENT DOCUMENTS

| 4,869,334 A | 9/1989 | Marumoto et al. |
| 4,882,586 A | 11/1989 | Dolph et al. |

(Continued)

FOREIGN PATENT DOCUMENTS

| DE | 3812317 A1 | 11/1988 |
| DE | 4404648 A1 | 8/1994 |

(Continued)

OTHER PUBLICATIONS

International Search Report dated Mar. 27, 2017 in corresponding application PCT/EP2017/050969.

*Primary Examiner* — Adam D Tissot
(74) *Attorney, Agent, or Firm* — Muncy, Geissler, Olds & Lowe, P.C.

(57) ABSTRACT

The invention relates to a computer architecture and functional architecture for the operation of electric power steering, to an electronic control unit, and to power steering, having a first group of modules with a high probability of failure and a second group of modules with a low probability of failure. In this case, the modules of the first group have a higher probability of failure than the modules of the second group. The first group of modules is maintained redundantly in this case and, as a result, divided into main modules and into the redundant implementation of what are known as secondary modules. The main modules are arranged on a main control path and the secondary modules are respectively arranged on a secondary control path. Each of these control paths ultimately produces a control signal, i.e., a main control signal and a secondary control signal. A multiplexer is used to decide which of these two control (Continued)

signals is forwarded to modules from the second group. This second group of modules is implemented only once and not present in redundant form.

16 Claims, 2 Drawing Sheets

(51) Int. Cl.
*G06F 11/00* (2006.01)
*G06F 11/16* (2006.01)
*G06F 13/00* (2006.01)
*B62D 5/04* (2006.01)

(56) References Cited

U.S. PATENT DOCUMENTS

| | | | |
|---|---|---|---|
| 4,924,960 A | | 5/1990 | Crill |
| 5,504,679 A | | 4/1996 | Wada et al. |
| 6,373,217 B1 | * | 4/2002 | Kawada ............... B62D 5/0463 |
| | | | 180/443 |
| 9,248,853 B2 | | 2/2016 | Kuwahara et al. |
| 9,254,863 B2 | | 2/2016 | Kuwahara et al. |
| 2004/0243287 A1 | | 12/2004 | Yanaka et al. |
| 2014/0214277 A1 | * | 7/2014 | Brenner ............. G06F 11/1487 |
| | | | 701/41 |

FOREIGN PATENT DOCUMENTS

| | | |
|---|---|---|
| DE | 19832506 A1 | 1/2000 |
| EP | 2559985 A1 | 2/2013 |
| EP | 2755881 A1 | 7/2014 |

\* cited by examiner

COMPUTER ARCHITECTURE AND FUNCTIONAL ARCHITECTURE FOR INCREASING THE FAIL-SAFETY OF AUXILIARY POWER STEERING

This nonprovisional application is a continuation of International Application No. PCT/EP2017/050969, which was filed on Jan. 18, 2017, and which claims priority to German Patent Application No. 10 2016 102 259.4, which was filed in Germany on Feb. 10, 2016, and which are both herein incorporated by reference.

BACKGROUND OF THE INVENTION

Field of the Invention

The invention relates to a computer architecture and functional architecture for operating electric power steering for increasing the fail-safety and availability.

Description of the Background Art

Electric power steering (EPS) is used to exert an assisting force on the mechanical control system. In this case, there is usually an electronic control unit (ECU), which sends corresponding control signals, so that mechanical actuators are moved, e.g., a servomotor on the control column or a rack with driven gears. It is desired in this case to ensure a certain fail-safety or availability so as to ensure certain quality criteria, such as, e.g., an Automotive Safety Integrity Level (ASIL), which is customary in the automotive sector and is stipulated, for example, for autonomous driving.

Conversely, a failure is also referred to as a sudden loss of system functionality. Such a loss of system functionality may also go beyond the mere loss of power assistance, namely, when the power steering applies a force that is opposite the desired steering movement and can override or block the steering.

The availability is indicated by an inverse measurement variable called failure in time (FIT). This is a failure rate related to the time interval of one billion hours, i.e., the number of failures per $10^9$ hours. Availability according to the standard ISO 26262 for safety-related systems refers to the ability of a device to perform a function under given conditions for a specific time or specific period of time, provided that the required external resources are available.

The state of the art trying to increase the fail-safety can be divided into two different categories: (1) Redundancy of monitoring within the ECU; and (2) Redundancy of a part of the system outside the ECU Category 1 is the state of the art for today's ECUs for EPS that meet the requirements of the ASIL-D standard. These have a FIT level for the sudden loss of assistance in the range of 1600 to 500 FIT, depending on software measures that possibly implement a limited operating mode. However, it is not possible to reach lower FIT levels such as, e.g., 100. A design of such an approach can be based on the fact that a main safety controller and an auxiliary safety controller are operated, e.g., in a 32-bit lockstep mode. Other concepts such as, e.g., EGAS are also possible.

The second category systems refer to partial or complete redundancy of the electronic system. Thus, in the case of ECU power supply redundancy, only one power supply error is covered by the ECU, but the FIT level for the sudden loss of assistance still remains in the range of 1600 to 5000 FIT, depending on the software measures and the possible implementation of a limited operating mode. In the event of full redundancy of the ECU, the FIT level for the sudden loss of assistance drops below 100 FIT, but this solution causes a very high complexity, high cost, and thus a different structure of the system in the vehicle.

Examples of the first category can be found in the publications EP 2755881 A1 and U.S. Pat. No. 7,165,646 B2, all of which do not reach the goal of a FIT level of 100.

The following prior art publications belong to the second category:

DE 19832506 A1 teaches an electrical power supply for power steering with a main power supply and a separate backup battery. U.S. Pat. No. 8,593,084 B2 shows a second, alternative power supply for power steering. These solutions do not reach the FIT level of 100, because the inventions focus on a redundant power supply, whereas the ECU itself still has a FIT level of 1600 to 500.

The publication U.S. Pat. No. 6,693,405 B2 teaches an electric power steering system, which is also assigned to category 2. This solution succeeds in achieving a FIT level below 100, because the ECU functions are all duplicated. However, this solution has the following disadvantages:

use of a 6-phase electric motor, which means additional expense for integrating the motor in the ECU, requires a redundant power supply, which causes a change in the electrical architecture of the vehicle, such as, e.g., at the connectors to the battery or cable harnesses, no possibility of mass production, not even in small quantities, in the foreseeable future, high costs.

SUMMARY OF THE INVENTION

It is therefore an object of the present invention to provide an architecture (computer architecture and functional architecture) for an ECU which reduces the probability of a sudden loss of assistance of the power steering due to errors in the ECU itself from 500 FIT to under 100 FIT. In this case, a solution is to be pursued that is cost-effective and can be easily integrated into existing systems.

A computer architecture and functional architecture are proposed for the operation of electric power steering having a first group of modules with a high probability of failure and a second group of modules with a low probability of failure. In this case, the modules of the first group have a higher probability of failure than the modules of the second group. The first group of modules is maintained redundantly in this case and, as a result, divided into main modules and into the redundant implementation of what are known as secondary modules. The main modules are arranged on a main control path and the secondary modules are respectively arranged on a secondary control path. Each of these control paths ultimately produces a control signal, i.e., a main control signal and a secondary control signal. A multiplexer is used to decide which of these two control signals is forwarded to modules from the second group. This second group of modules is implemented only once and not present in redundant form.

A control path is used to generate control signals. The generated control signals depend on the processing mode and on the input variables in the control path, e.g., sensor signals. The generated control signals can act, inter alia, on data paths, other control paths, or actuators. In the present case, the ECU performs calculations for electric power steering based on input signals or input variables, sensors, or peripheral modules such as, e.g., a torque sensor or battery voltage or data signals of the CAN interface. From these variables, the ECU, in particular the computing unit, determines the state of the steering system and a desired power steering assistance. This information, which may be available as a data signal, is forwarded via circuit breakers to a servomotor, which lies outside the ECU. This servomotor causes the application of a force on the steering.

According to the invention, part of the entire control path passing through the ECU is provided redundantly. Based on common input signals, modules on the main control path determine certain state variables in the same way as modules on the secondary control path. One of the two control paths is routed via a multiplexer internally in the ECU, whereas the control signal of the other path is discarded. The forwarded control signal is further processed in the modules of the second group, so that at the end an output control signal arises, which emerges from the ECU, in particular one that controls the external actuator.

One way of deciding which of the two control signals the multiplexer forwards is the stipulation of an error signal indicating whether or not the main control path provides an error-free signal. If it does not do this, the multiplexer could forward the signal of the secondary control path.

The proposed partial hardware redundancy within the ECU splits it into a redundant and non-redundant part corresponding to the first and second group of modules.

The division into a first and second group of modules, wherein the second group has a low probability of failure, is also based on the consideration of measures already taken to increase or decrease the probability of failure. Thus, a software strategy, implemented in the ECU, can result in the modules of the second group having a low probability of failure in the first place. The software can include functions that detect errors in these modules and take steps to compensate or work around them. A possible workaround would be, e.g., the provision of a limited operating mode.

For example, the following advantages result from the present invention: an interface-independent solution (all-inside solution) that does not require any changes to the peripherals or interfaces of the ECU compared with a conventional ECU. A flexible transition between a prior art solution that may continue to be produced and the proposed solution; integration in the same vehicle is possible, because no additional connectors, no additional power supply, or cable harnesses are necessary; elimination of a faulty control function and avoidance of a sudden loss of assistance; rapid switching from the main control path to the secondary control path with a smooth transition results in a reduction of the danger to the vehicle driver, due to an assistance loss and a comfortable feeling while driving; low cost, because two motors or two electronic control units are not necessary. For example, such a six-phase BLDC motor or additional redundancy is not absolutely necessary to achieve the desired FIT level; and suitable for various types of EPS systems, e.g., steering column EPS and rack EPS (passenger/motor compartment).

In an embodiment, the two redundant control paths can perform the same calculations in parallel at any point in time, so that both control signals are available at all times. This is called "hot redundancy" and can be used for rapid switching or for a possible error correction as well.

In an embodiment, the secondary control path can be only partially calculated or not at all and can completely take up and take over the calculation only in the event of an error on the main control path. Depending on how fast the secondary control path can take up its task, the time between detection of the error and assumption of the function by the secondary control path suffices for a continuous functionality of the power steering. With this variant, resources, e.g., power consumption for the secondary control path, could perhaps be saved.

In an embodiment of the computer architecture and functional architecture, the first group of modules comprises at least one of the modules: current monitor or computing unit. The second group of modules comprises at least one of the modules: driver, power stage, or phase cut-off/phase control.

An ECU can have the following modules along its control path: an integrated circuit, which takes over the power management (power management integrated circuit (PMIC)), which interacts with a computing unit (core of the microcontroller (MCU)), which performs the essential calculations, receives the sensor and peripheral signals, fulfills monitoring tasks, and finally determines the signals as to how the motor should be controlled or the output signal from the ECU should appear. The control signal emerging from the computing unit is passed via the already described multiplexer to a driver stage (gate driver unit, GDU), which in turn controls a power stage (PS) connected to the output of the control signal via a phase cut-off (PCO). This output is usually connected to the servomotor. The phase cut-off can comprise phase-on and phase-off control. The power stage can be designed as a so-called B6 bridge, whereas the driver unit can be designed as a gate driver unit.

The modules most likely to contribute to errors leading to a sudden loss of assistance can comprise the power management system, or current monitor, and the computing unit. If only these modules are implemented redundantly, a partial hardware redundancy is produced, wherein just the current monitor and the computing unit are present twice and optionally even more frequently. A multiplexer, which selects and connects through the appropriate control signal, is still needed as an additional module. Although this multiplexer constitutes an additional component or module, the susceptibility to errors (FIT) is hardly increased, because this is a relatively simple component with a low susceptibility to errors.

This consideration can require that software measures be taken to influence the non-redundant modules, i.e., e.g., the modules of the second group, such that a possible error in these modules does not result in a complete loss of assistance.

One such measure, which does not always have to be limited to software implementation, is, for example, the use of a microcontroller with at least two computing units which execute the same program in the lockstep mode and perform the same calculations. This traditionally occurs in a microcontroller with two computer cores whose computational results, for example, can be compared with each other to detect errors.

In such a case, the proposed structure would have two microcontrollers with a total of four computer cores, wherein one microcontroller represents a main module and the other a secondary module. The computation by the software in the lockstep mode on each microcontroller does not necessarily serve the redundancy according to the invention, namely, the provision of a main and secondary control path. Rather, these computations can attempt to detect other causes of errors elsewhere, e.g., plausibility check of computation results or sensor values.

Of course, the use of a microcontroller, which is not operated in lockstep mode, is likewise conceivable. In this case, there would be a computing unit on a main microcontroller and a second computing unit on a secondary microcontroller. The computing unit and microcontroller would be virtually identical here.

A further reason for using the lockstep mode is to achieve the standard (ASIL-D) for each path so as to eliminate as far as possible a blocking or overriding steering. In this case, the two control paths can be operated as independently as possible in order to avoid influencing one control path by errors on the other control path.

A further advantage is that the redundant layout of the modules of the first group is designed so that a low-voltage signal, i.e., e.g., a signal in the range of 3 to 6 volts, is switched by the multiplexer; in contrast to higher voltage signals, this enables faster switching times and lower power losses.

In an embodiment of the computer architecture and functional architecture, a main module sets a main error signal in the event of an error of a main module and a secondary module sets a secondary error signal in the event of an error of a secondary module.

Such an error signal can be a signal which assumes the logical values zero or one, i.e., a digital signal, wherein the logic can also be inverse, i.e., that it does not indicate an error but the functional or error-free state.

The said type of error signal setting is advantageously designed such that each path or the modules of the respective path monitor themselves and automatically report an error via this signal.

In an embodiment of the computer architecture and functional architecture, the only communication between the main error path and the secondary error path and vice versa is the transmission of main error signals from main modules to secondary modules and/or the transmission of secondary error signals from secondary modules to main modules.

Communication between the main error path and the secondary error path can mean that at least one module of the respective error path communicates with at least one module of the other path, e.g., exchanges data that are evaluated by modules of the other control path. In particular, such communication relates to the exchange of digital signals indicating a state such as, e.g., said error signals.

In this embodiment, further communication or further exchange of information about these error signals, e.g., beyond the error status, is not provided here.

The advantage of restricting communication in this way serves to avoid systematic multiple errors that could occur with more extensive interaction between the two signal paths. The two control paths are operated independently as far as possible in order to avoid influencing a control path by errors due to data exchange.

In other words: the only information a module of a path receives about modules of the other path is a signal that an error has occurred on the other path or in another module of the other path. This means that an error signal results, according to the earlier description, solely due to the computations of the modules of a path and no interaction of modules or signals of both paths.

In an embodiment of the computer architecture and functional architecture, a main module sets a secondary error signal in the event of an error of a secondary module and a secondary module sets a main error signal in the event of a main module error.

This is an alternative or additional embodiment to what has already been described; here as well a path can detect errors in the respective other path (or its modules) and can set the corresponding error signal of the respective other path. As a result, each path can monitor the other path. This can occur additionally or alternatively to the monitoring of its own path.

For example, a monitoring component/module (watchdog) can be provided in the secondary control path that monitors the modules of the main control path. In addition or alternatively, a watchdog can be present in the main control path, which monitors modules of the secondary control path and possibly sets an error path of the secondary control path.

Better detection of errors is possible by this measure, if applicable, and this allows the taking of measures that reduce the susceptibility to errors overall.

In an embodiment of the computer architecture and functional architecture, the first group of modules comprise a current monitor and a computing unit, in particular a main current monitor, a main processing unit and, parallel thereto, a redundant secondary current monitor and redundant secondary computing unit. The main current monitor sets a second main error signal when it detects an error of the main current monitor or main computing unit. The main computing unit sets a first main error signal when it detects an error of the main computing unit. The secondary current monitor sets a second secondary error signal when it detects an error of the secondary current monitor or secondary computing unit. The secondary computing unit sets a first secondary error signal when it detects an error of the secondary computing unit.

In other words: A main current monitor, e.g., a power management integrated circuit, generates an error signal for errors in modules on the main control path, especially if it detects a defect of the main current monitor or the main computing unit itself, wherein this error signal is called the second main error signal. A main computing unit, in particular a main microcontroller, generates an error signal for errors in a module on the main control path, in particular for a defect of the main computing unit itself, wherein this error signal is called the first main error signal.

A secondary current monitor, e.g., a power management integrated circuit, generates an error signal for errors in modules on the secondary control path, especially if it detects a defect in the secondary current monitor or the secondary computing unit itself, wherein this error signal is called the second secondary error signal. A secondary computing unit, in particular a secondary microcontroller, generates an error signal for errors in a module on the secondary control path, in particular for a defect in the secondary computing unit itself, wherein this error signal is called the first secondary error signal.

A so-called error of the respective computing unit can in the present case refer to a defect of the computing unit itself or to an error state which the computing unit finds. This can comprise: internal or external errors of the computing unit or the microcontroller, plausibility check error of the PWM signal, detected errors of the peripherals of the computing unit such as the ADC, motor timer, ignition and speed signals, or other modules/sensors, especially those that can lead to the sudden loss of assistance. Missing or incorrect data from peripheral modules or sensors can lead to system states no longer being determinable so precisely so as to ensure safe power steering.

In an embodiment of the computer architecture and functional architecture, the multiplexer forwards the control signal of the secondary control path when the main error signal is set and otherwise the control signal of the main control path.

In particular, the multiplexer can forward the control signal of the secondary control path when the second main error signal is set.

In an embodiment, the multiplexer can also forward or switch through one of the two paths when the secondary error signal or a combination of the error signals is set.

In an example, this occurs as follows: the main computing unit sets the first main error signal, whereupon the main current monitor sets the second main error signal, which it triggers due to a serial peripheral interface (SPI) command from the main computing unit. In another example, the main current monitor sets the second main error signal because the main current monitor watchdog is no longer operated by the main computing unit.

Such a design allows that only an exchange of the error signals between the two paths takes place and a comparison of the control signals or other data of both paths is at most additional but not necessary. By the sole replacement of the first and second main or secondary error signal, it is possible to distinguish error states from normal operating modes such as, e.g., a power-off sequence.

As an example: setting the first main error signal can mean that an error has been detected in the main computing unit that results in a loss of assistance. The secondary computing unit waits for the second main error signal in order to gain control of the driver stage and power stage as soon as the multiplexer switches to the secondary control path. On the other hand, the setting of the first main error signal can also mean that the ECU is switched off because, e.g., the ignition signal (e.g., terminal 15) is off. In this case, the secondary computing unit can check what the state of the ignition signal is to start the power-off sequence, if necessary, instead of taking over the further computation of the control signal.

In an embodiment of the computer architecture and functional architecture, an emergency operating mode is activated when the main error signal is set and at the same time the secondary error signal is set.

An emergency operating mode of this kind can be a safety mode, a system shutdown, or a continuation of operation with limited functionality.

In particular, the mentioned error signals are the second main signal or the second secondary error signal.

Errors can be differentiated even more precisely by this redundancy, so that a number of different emergency operating modes are also possible and thus make the system overall less susceptible to a sudden total failure.

Also proposed further is an electronic control unit or a combined motor/electronic control unit according to the proposed computer architecture and functional architecture.

In an embodiment of the electronic control unit or the combined motor/electronic control unit, this has no redundant interfaces.

In other words: External interfaces of the ECU are not present redundantly.

By this measure, an ECU of the invention can easily replace a conventional ECU, without major structural changes to the peripherals, in particular at the external interfaces, having to be made.

In an embodiment, external interfaces can also be provided redundantly, which, if necessary, have to be connected only once in order to also obtain the aforementioned advantage thereby.

Also proposed is a power steering, also called servo steering, which is equipped with a proposed electronic control unit or a combined motor/electronic control unit.

An ECU of this kind can be used for motor control of the power steering, e.g., a column EPS or rack EPS.

In an embodiment, a subsequent phase cut-off (PCO phase cut-off/control supply) can be configured redundantly and activated in each case by the error signals. A main phase cut-off can be active, e.g., when neither a first nor a second main error signal is present. Similarly, a secondary phase cut-off can be active when neither a first nor a second secondary error signal is present.

There can be different types of errors. These include errors in the sensors or the external peripherals, further errors in the ECU itself such as, e.g., defects in some modules, and errors in the control or in the motor itself. In the case of error, a reaction can take place in different ways:

1. Continuation of the full assistance by taking over of the function by a redundant system, which either can be maintained redundantly as described and/or obtains missing information otherwise by suitable software measures. This can be the case, e.g., if the main microcontroller in the ECU fails and the secondary microcontroller takes over its function. This is accompanied according to the invention with a change of control from the main control path to the secondary control path.
2. In a limited operating mode (limited or degraded mode), it is attempted to maintain the assistance at least partially. Either an attempt is made to maintain assistance as well as possible and, for example, to estimate or interpolate missing information, or the functionality is deliberately limited to give the vehicle driver feedback about the problem or an impending failure.
3. Shutdown of the assistance (shut-off/safety mode), if a controlled availability is no longer possible. This can happen, e.g., in the case of a double error if one module in the main control path and one module in the secondary control path fail. In any case, an uncontrolled continuation of the assistance should be avoided, which can bring the vehicle into a critical state, e.g., by blocking or overriding the steering.

The proposed system can also be combined with other error handling methods or other redundant systems. Thus, software safety measures can enable limited operating modes or to prevent random hardware errors, two capacitors connected in series can be used for the ceramic capacitors which may be installed in the B6 bridge or sensor data acquisition units or the driver.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
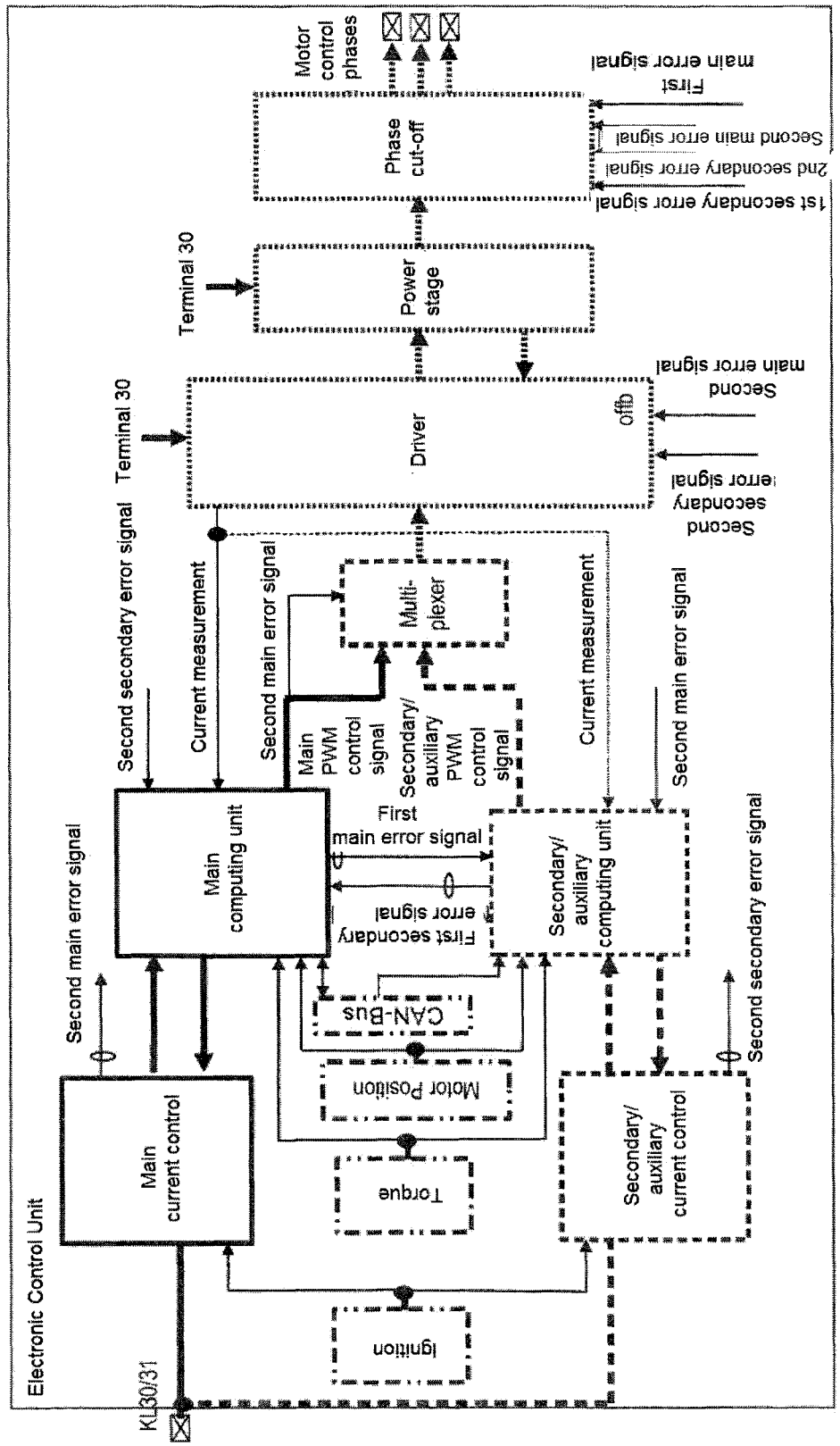
FIG. 1 illustrates an ECU for controlling a power steering.

FIG. 1 shows an electronic control unit (ECU) in which the signal flow takes place essentially from left to right. A solid, thick line indicates modules and the path of the main control path (the upper path). Modules and signals of the main control path have the prefix "MAIN" or the suffix "_M."

The dashed line indicates modules and the path of the secondary control path (the lower path). These are also installed in the electronic control unit (ECU) together with the multiplexers (DMUX), also shown as dashed lines, to enable partial redundancy. Modules and signals of the secondary control path carry the prefix "AUX", or optionally also "SUB" or as a suffix "_S."

In the further course starting from the multiplexer (DMUX), the further common control path and its modules (the second group) are identified by a dotted line or border. Finally, connections are provided for connecting a motor, here referred to as the three phases U/V/W.

Further, other input variables or modules processing such input variables are shown as the ignition (IGN), the speed or torque, the motor position, or a bus connection (CAN). These are shown with a dot-dashed line.

Further internal state variables and signal flows are, for example, those from the respective computing unit (MCU) or microcontroller to the current monitoring unit (PMIC), the current measurement (shunt current), which leads from the driver (GDU) to the respective computing unit (MCU), or information on the power stage (PS), which is passed to the driver (GDU). According to the association described, these signals are also drawn using a solid, dashed, or dotted line.

A main control path is shown (solid, thick line) leading from the external power supply KL30/31 (terminal 30—continuous current) to a main current monitor (MAIN PMIC) which ensures the correct voltage supply of the subsequent main computing unit (MAIN MCU) and the diagnosis thereof. The same arrangement applies to the secondary control path (dashed, thick line) with the secondary current monitor (AUX PMIC) and the secondary computing unit (AUX MCU).

The error signals described below are marked with single, i.e., thin, solid lines and attached arrows. In this case, the main current monitor supplies a second main error signal ($2^{nd}$_Safety_M), which is set when an error is detected in the main current monitor (MAIN PMIC) or the main computing unit (MAIN MCU). The main computing unit, on the other hand, supplies a first main error signal ($1^{st}$_Safety_M) indicating an error detected by or in the main computing unit.

This also applies to the errors of the modules on the secondary control path. The secondary current monitor (AUX PMIC) supplies a second secondary error signal ($2^{nd}$_Safety_S), which indicates an error detected in the secondary current monitor (AUX PMIC) or secondary computing unit (AUX MCU). The secondary computing unit (AUX MCU) supplies a first secondary error signal ($1^{st}$_Safety_S), which represents an error detected by or in the secondary computing unit (AUX MCU).

The main computing unit (MAIN MCU) obtains information from the first secondary error signal ($1^{st}$_Safety_S), which is sent out by the secondary computing unit (AUX MCU). Conversely, the secondary computing unit (AUX MCU) receives information from the first main error signal ($1^{st}$_Safety_M), which is sent out by the main computing unit (MAIN MCU). Further, the main computing unit (Main MCU) obtains information via the second secondary error signal ($2^{nd}$_Safety_S). The secondary computing unit (AUX MCU) likewise obtains information via the second main error signal ($2^{nd}$_Safety_M). The second main error signal ($2^{nd}$_Safety_M) is provided by the main current monitor (MAIN PMIC). The second secondary error signal ($2^{nd}$_Safety_S) is likewise provided by the secondary current monitor (AUX PMIC).

Both the main and secondary control paths or their modules receive all the data coming from the various sensors, from the vehicle interface, the motor, the driver, the torque, the motor position sensor, the CAN bus interface, and the current feedback or shunt current. These data are used to perform calculations that provide the necessary assistance, i.e., in particular the control signals for the driver (GDU) and finally the motor control. In one embodiment, the main and secondary control paths are both operative and capable of taking over the control of the motor at any time.

The particular computing unit (MCU) generates in each case a PWM signal (MAIN PWM ENA and AUX PWM ENA), which is supplied to the multiplexer (DMux). This switches through one of the two control signals and forwards it to the driver (GDU). In the figure shown, the multiplexer (DMux) is switched as a function of the second main control signal ($2^{nd}$_Safety_M). If there is no error, then the control signal of the main error path is forwarded, but in the case of an error, the control signal of the secondary control path is forwarded by the multiplexer (DMux).

The subsequent driver stage (GDU), which receives one of these two control signals, can likewise be switched off when the second main error signal and the second secondary error signal are present, in particular in an AND combination of the two error signals.

The signal of the driver (GDU) reaches the power stage (PS) and finally thereupon the phase control (PCO). The latter can also be designed redundantly, wherein a main phase control is switched off in the presence of a first or second main error signal, whereas independently thereof a secondary phase control is switched off in the presence of a first or second secondary error signal. As a result, the phase control (PCO) represents a safety switch if both paths, the main and secondary control path, provide erroneous signals. This type of shutdown interrupts the cutting off of assistance from the motor, i.e., an application of force. The motor can then no longer apply force to the steering, so that the latter can continue to be operated manually, but also experiences no incorrect force application.

Figure 2:
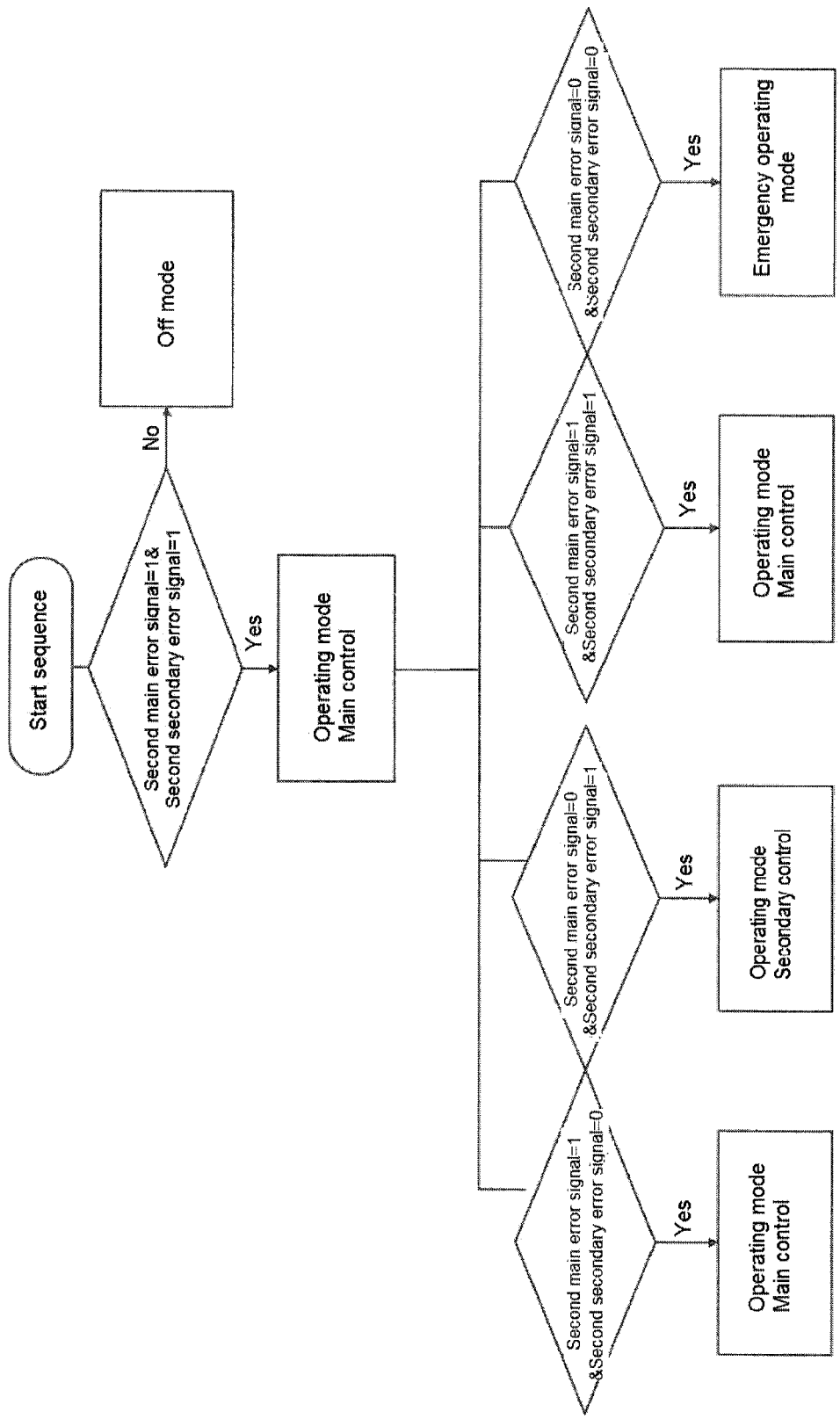
FIG. 2 is a state diagram based on the state of the error signals

FIG. 2 shows a state diagram representing the various states of the electronic control unit (ECU) as a function of the error signals. Starting from a start state (start-up), it is checked whether neither a second main error signal nor a second secondary error signal is set. In this diagram, the logic is inverse; i.e., the logical value zero would indicate an error. Thus, an enable signal is perceived from the error signal, but this makes no difference to the further consideration.

If there is an error, no assistance is provided and the system is set to an OFF mode. However, if the system is error-free and thus ready for operation, thus it is set to the operating mode (RUN mode) on the basis of the main control signal (MAIN control signal).

If an error were to occur during operation (RUN mode), the process is as follows:

In the presence of a second secondary error signal without the presence of a second main error signal, the operating mode (RUN mode) remains based on the main control signal (MAIN control signal).

In the presence of an error of the second main error signal and no error in the second secondary error signal, the operating mode (RUN mode) is switched to the effect that instead of the main control signal (MAIN control signal), the secondary control signal (AUX control signals) is switched through and the signals of the secondary control path now effect the control of the motor.

As long as neither the second main error signal nor the second secondary error signal are set or these error states were to be canceled, the operating mode (RUN mode) remains or is switched back to on the basis of the main control signal (MAIN control signal).

If an error is indicated by the second main error signal and at the same time by the second secondary error signal, then the operating mode and a safety mode (SAFE mode) end, and a safe mode is activated. This can result in the complete shutdown of the assistance. Special embodiments for limited operating modes are not included further here.

These transitions are switched in the low voltage range, i.e., in the automotive industry at voltages up to about 6 volts. This has energetic advantages and allows a quick change between the control paths and thus a smooth transition of the motor control.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A computer architecture and functional architecture for operation of an electric power steering, comprising:
    a first group of modules designated as having a first probability of failure;
    a second group of modules designated as having a second probability of failure; and
    a multiplexer,
    wherein the first group of modules have a higher probability of failure than the second group of modules,
    wherein the first group of modules is maintained redundantly and, as a result, main modules and secondary modules of the first group of modules are provided in redundant implementation, the main modules being arranged on a main control path and the secondary modules being arranged on a secondary control path, and the main modules generating a main control signal and the secondary modules generating a secondary control signal,
    wherein the second group of modules is implemented only once, the second group of modules each generating a first signal that is combined into the main control signal, and the second group of modules each generating a second signal that is combined into the secondary control signal, and
    wherein the multiplexer forwards one of the main control signal and the secondary control signal to a driver.

2. The computer architecture and functional architecture according to claim 1, wherein the first group of modules comprises at least one of the following modules:
    a current monitor; or
    a computing unit, and
wherein the second group of modules comprises at least one of the following modules:
    a driver;
    a power stage; or
    a phase cut-off.

3. The computer architecture and functional architecture according to claim 1, wherein a main module of the main control modules sets a main error signal in an event of an error of a main module and wherein a secondary module of the secondary control modules sets a secondary error signal in an event of a secondary module error.

4. The computer architecture and functional architecture according to claim 1, wherein the only communication between the main control path and the secondary control path or between the secondary control path and the main control path includes:
    transmission of main error signals from the main modules to the secondary modules; and
    transmission of secondary error signals from the secondary modules to the main modules.

5. The computer architecture and functional architecture according to claim 1, wherein a main module sets a secondary error signal in an event of an error of a secondary module, and wherein a secondary module sets a main error signal in an event of an error of a main module.

6. The computer architecture and functional architecture according to claim 2, wherein the first group of modules comprise a current monitor and a computing unit, in particular a main current monitor, a main computing unit, and parallel thereto, a redundant secondary current monitor and a redundant secondary computing unit, wherein the main current monitor sets a second main error signal when it detects an error of the main current monitor or the main computing unit, wherein the main computing unit sets a first main error signal when it detects an error of the main computing unit, wherein the secondary current monitor sets a second secondary error signal when it detects an error of the secondary current monitor or the secondary computing unit, and wherein the secondary computing unit sets a first secondary error signal when it detects an error of the secondary computing unit.

7. The computer architecture and functional architecture according to claim 3, wherein the multiplexer forwards the secondary control signal of the secondary control path when the main error signal is set by the main control module, and when the main error signal is not set, the multiplexer forwards the main control signal of the main control path.

8. The computer architecture and functional architecture according to claim 1, wherein an emergency operating mode is activated when a main error signal is set by the main control modules and at a same time a secondary error signal is set by the secondary modules.

9. An electronic control unit or combined motor/electronic control unit, comprising a computer architecture and functional architecture according to claim 1.

10. The electronic control unit or combined motor/electronic control unit according to claim 9, wherein external interfaces are not present redundantly.

11. A power steering comprising an electronic control unit or a combined motor/electronic control unit according to claim 9.

12. The computer architecture and functional architecture according to claim 1, wherein redundancy for the first group of modules is hardware redundancy for each module of the first group of modules.

13. An electronic control unit, comprising:
    at least one main control unit outputting a main control signal;
    at least one auxiliary control unit providing hot-redundancy for the at least one main control unit by parallel computation with the at least one main control unit, and outputting an auxiliary control signal;
    at least one system control unit transmitting a first control signal to the at least one main control unit and transmitting a second control signal to the at least one auxiliary control unit;

a multiplexer receiving the main control signal and the auxiliary control signal, the multiplexer transmitting the main control signal, when a first error logic value is not set, to a driver, the multiplexer transmitting the auxiliary control signal, when the first error logic value is set, to the driver, wherein the first control signal is encoded in the main control signal, and the second control signal is encoded in the auxiliary control signal, and wherein the at least one main control unit and the auxiliary control unit exchange error signals indicating failure of the at least one main control unit and/or the at least one auxiliary control unit.

14. The electronic control unit of claim 13, further comprising:
a first main control unit and a second main control unit of the at least one main control unit;
a first auxiliary control unit and a second auxiliary control unit of the at least one auxiliary control unit, the first auxiliary control unit providing parallel computation for the first main control unit, and the second auxiliary control unit providing parallel computation for the second main control unit;
a first system control unit and a second system control unit of the at least one system control unit, the first system control unit transmitting the first control signal to the first main control unit and transmitting the second control signal to the first auxiliary control unit, the second system control unit transmitting a third control signal to the second main control unit and transmitting a fourth control signal to the second auxiliary control unit,
wherein the first main control unit is connected to the second main control unit,
wherein the first auxiliary control unit is connected to the second auxiliary control unit,
wherein the first main control unit is connected to the multiplexer via a first signal path and the first auxiliary control unit is connected to the multiplexer via a second signal path, and
wherein the first main control unit is connected to the first auxiliary control unit via a first error signal path and a second error signal path.

15. The electronic control unit of claim 13, wherein the at least one main control unit, the at least one auxiliary control unit, the at least one system control unit, and the driver are implemented in hardware on the electronic control unit.

16. The electronic control unit of claim 13, wherein the first error logic value indicates an error condition in the at least one main control unit, and a second error logic value provided in the multiplexer indicates another error condition in the at least one auxiliary control unit,
wherein an emergency operating mode of the electronic control unit is initiated if the first error logic value is set and the second error logic value is set, and
wherein the electronic control unit operates in the emergency operating mode with a reduced functionality.

* * * * *